United States Patent
Scholte-Wassink

(10) Patent No.: US 7,750,490 B2
(45) Date of Patent: Jul. 6, 2010

(54) METHOD AND SYSTEM FOR EXTRACTING INERTIAL ENERGY FROM A WIND TURBINE

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/550,123

(22) Filed: Aug. 28, 2009

(65) Prior Publication Data
US 2010/0133821 A1 Jun. 3, 2010

(51) Int. Cl.
*H02P 9/00* (2006.01)
*F03D 7/00* (2006.01)

(52) U.S. Cl. .......................... 290/44; 290/55
(58) Field of Classification Search .......... 290/43, 290/44, 54, 55; 322/4
See application file for complete search history.

(56) References Cited

U.S. PATENT DOCUMENTS

| | | | | |
|---|---|---|---|---|
| 5,083,039 | A * | 1/1992 | Richardson et al. | 290/44 |
| 5,798,631 | A * | 8/1998 | Spee et al. | 322/25 |
| 5,798,632 | A * | 8/1998 | Muljadi | 322/29 |
| 6,924,565 | B2 * | 8/2005 | Wilkins et al. | 290/44 |
| 7,205,676 | B2 * | 4/2007 | Ichinose et al. | 290/44 |
| 7,239,036 | B2 * | 7/2007 | D'Atre et al. | 290/44 |
| 7,397,143 | B2 * | 7/2008 | Walling | 290/44 |
| 7,505,833 | B2 * | 3/2009 | Delmerico et al. | 700/291 |
| 2007/0085343 | A1 | 4/2007 | Fortmann | |
| 2008/0229255 | A1 | 9/2008 | Linjama et al. | |

FOREIGN PATENT DOCUMENTS

EP 0569556 12/1998

OTHER PUBLICATIONS

Lewis Page, "Prof: Use Wind Turbines as Flywheels to Smooth Output: The Register," http://www.theregister.co.uk/2009/01/09/wind_turbine_flywheel_ploy/print.html, Jan. 9, 2009, 2 pgs.
Asghar Abedini, Goran Mandic, Adel Nasiri, "Wind Power Smoothing Using Rotor Inertia Aimed at Reducing Grid Susceptibility," International Journal of Power Electronics 2008, http://www.inderscience.com/search/index.php?action=record&rec_id=22352, 2008, 227-247 pgs., vol. 1, No. 2, Inderscience Enterprises Limited.

* cited by examiner

*Primary Examiner*—Nicholas Ponomarenko
(74) *Attorney, Agent, or Firm*—James McGinness, Esq.; Armstrong Teasdale LLP

(57) ABSTRACT

A system for operating a wind turbine during a curtailment operation is described. The wind turbine includes a generator and a wind turbine rotor having at least one rotor blade. The wind turbine also includes a drive train that includes at least one shaft coupled to the wind turbine rotor and configured to drive the generator. The system includes a control system configured to increase a speed of rotation of the rotor beyond an optimum rated speed during the curtailment operation of the wind turbine, and an extraction device configured to extract inertial energy stored in the drive train upon release of the curtailment operation.

15 Claims, 5 Drawing Sheets

METHOD AND SYSTEM FOR EXTRACTING INERTIAL ENERGY FROM A WIND TURBINE

BACKGROUND OF THE INVENTION

The subject matter described herein relates generally to operation of a wind turbine and, more specifically, to extracting inertial energy from a wind turbine after a wind turbine curtailment is released.

Wind turbines utilize wind energy to produce electrical power. Wind turbines typically include a rotor having multiple blades that transform wind energy into rotational motion of a drive shaft, which in turn is utilized to drive a rotor of an electrical generator to produce electrical power. A plurality of wind turbines may be grouped together, sometimes referred to as a "wind farm."

In order to mitigate issues associated with turbine loading, delivery of power to the grid, and/or certain planning conditions (e.g., planned maintenance activities), the power output by some or all of the turbines within a wind farm may need to be reduced, also referred to as a "wind turbine curtailment." During a wind turbine curtailment, a level of power generated by the turbine is controlled (i.e., reduced to a curtailment level). Typically, during a wind turbine curtailment, a pitch angle of the rotor blades is adjusted to slow rotation of the rotor, which reduces the power output by the wind turbine. For example, during a wind turbine curtailment, the wind turbine may be configured to deliver forty-percent (40%) of a maximum level of electrical power able to be produced by the wind turbine. During a wind turbine curtailment, wind speeds may be such that it would be possible to produce the maximum level of electrical power able to be produced by the wind turbine, however, less power is generated for other reasons. In other words, aerodynamic energy present in the wind is purposefully not captured, and therefore, is wasted.

BRIEF DESCRIPTION OF THE INVENTION

In one aspect, a system for operating a wind turbine during a curtailment operation is provided. The wind turbine includes a generator and a wind turbine rotor having at least one rotor blade. The wind turbine also includes a drive train that includes at least one shaft coupled to the wind turbine rotor and configured to drive the generator. The system includes a control system configured to increase a speed of rotation of the wind turbine rotor beyond an optimum rated speed during the curtailment operation of the wind turbine, and an extraction device configured to extract inertial energy stored in the drive train upon release of the curtailment operation.

In another aspect, a method for operating a wind turbine during curtailment of the wind turbine is provided. The wind turbine includes a generator and a rotor having at least one rotor blade. The wind turbine also includes a drive train that includes at least one shaft coupled to the rotor and configured to drive the generator. The method includes operatively coupling a control system to the wind turbine, the control system configured to adjust wind turbine operation to facilitate increasing a speed of rotation of the rotor during curtailment of the wind turbine. The method also includes operatively coupling an extraction device to the generator, the extraction device configured to extract inertial energy stored in the drive train upon release of the curtailment.

In yet another aspect, a wind turbine is provided. The wind turbine includes a rotor having at least one rotor blade, and a generator operatively coupled to the rotor via at least one rotor shaft. The wind turbine also includes a control system operatively coupled to the rotor and the generator. The control system is configured to adjust wind turbine operation to facilitate increasing a rotor speed beyond an optimum rated speed during a curtailment of the wind turbine. The wind turbine also includes a frequency converter operatively coupled to the generator and to the control system. The frequency converter is configured to increase a torque demand on the generator upon release of the curtailment.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Technical effects of the systems, methods, and apparatus described herein include at least one of (a) configuring a control system to adjust wind turbine operation to facilitate increasing a rotor speed of a rotor during curtailment of the wind turbine; and (b) configuring an extraction device to extract inertial energy stored in a drive train of the wind turbine upon release of the curtailment.

Figure 1:
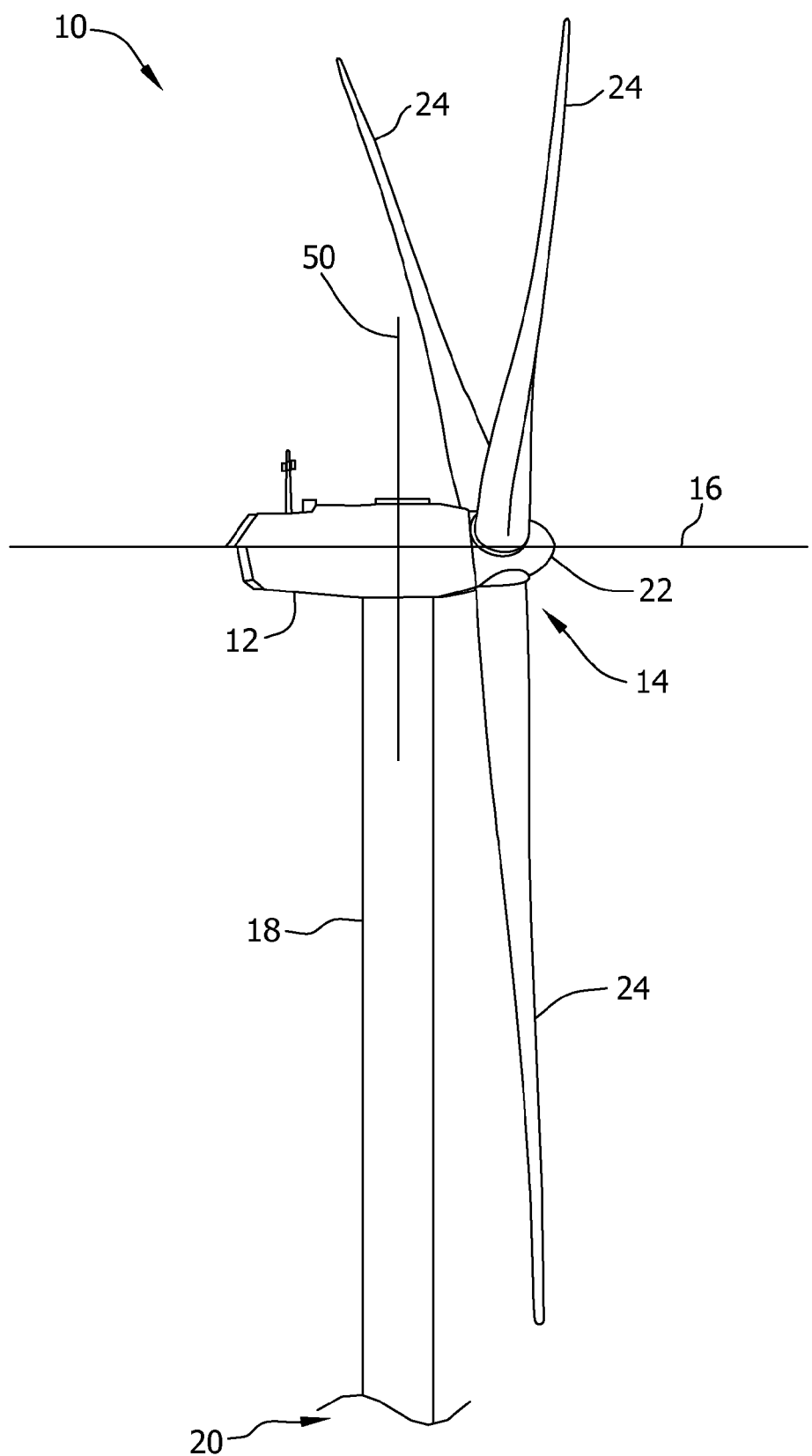
FIG. 1 is a perspective view of an exemplary wind turbine.
Figure 2:
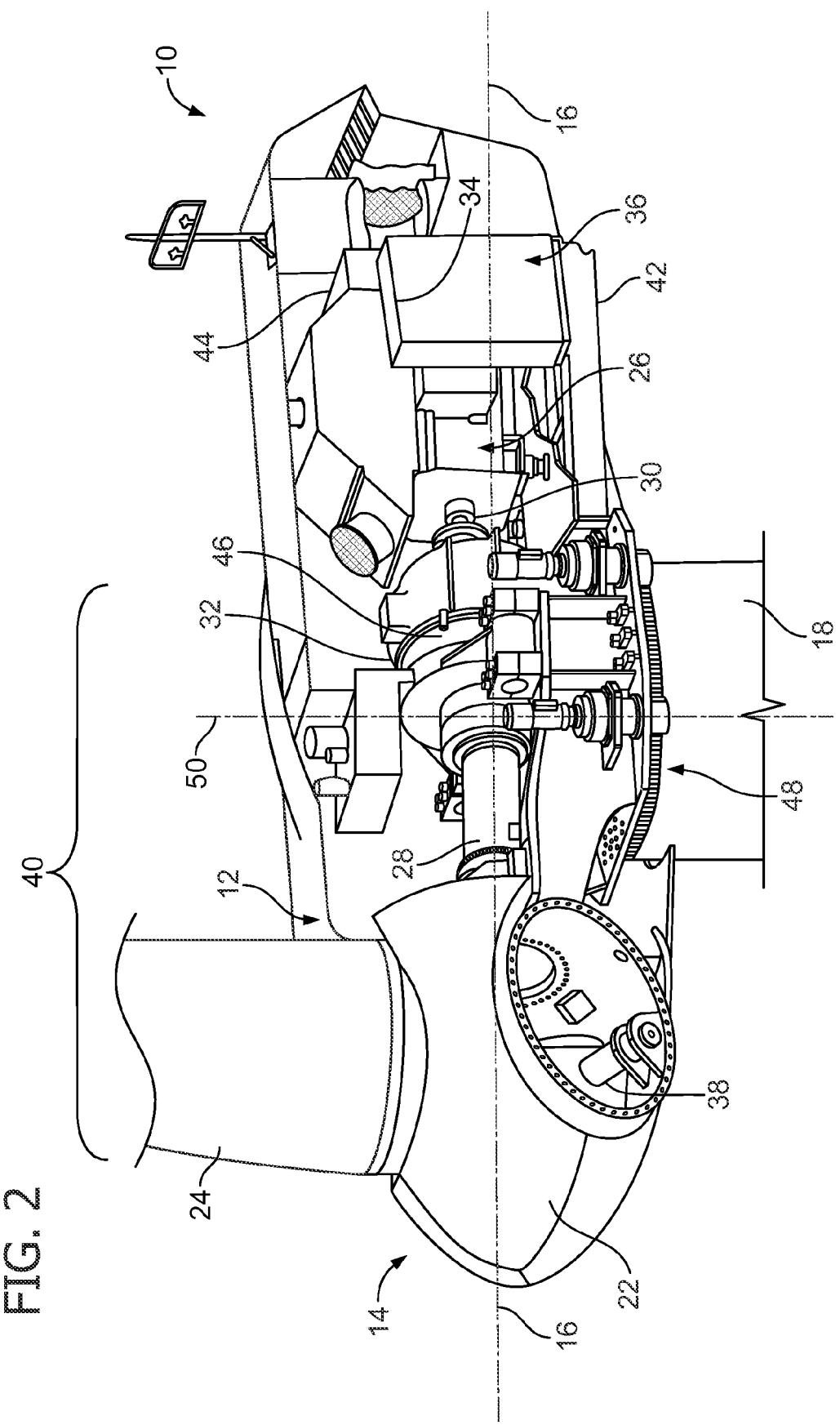
FIG. 2 is a partially cut-away perspective view of a portion of the wind turbine shown in FIG. 1.

FIG. 1 is a perspective view of an exemplary wind turbine 10. FIG. 2 is a partially cut-away perspective view of a portion of wind turbine 10. Wind turbine 10 described and shown herein is configured to generate electrical power from wind energy. Moreover, wind turbine 10 described and shown herein includes a horizontal-axis configuration. However, in some embodiments, wind turbine 10 may include, in addition to or as an alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or associated components and/or for supplying electrical power generated by wind turbine 10 thereto. Although only one wind turbine 10 is shown in FIGS. 1 and 2, in some embodiments, a plurality of wind turbines 10 may be grouped together to form a wind farm.

Wind turbine 10 includes a body 12, sometimes referred to as a "nacelle," and a rotor (generally designated by 14) coupled to body 12 for rotation with respect to body 12 about an axis of rotation 16. In the exemplary embodiment, body 12 is mounted on a tower 18 that extends from a base 20. However, in some embodiments, in addition to or as an alternative to tower-mounted body 12, wind turbine 10 includes a body 12 adjacent the ground and/or a surface of water. A height of tower 18 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and shown herein as having three blades 24, rotor 14 may have any suitable number of blades 24. Each blade 24 may have any suitable length that allows wind turbine 10 to function as described herein. For example, in some embodiments, one or more blades 24 are about one-half meter long, while in some embodiments one or more blades 24 are about fifty meters long. Other examples of blade 24 lengths include ten meters or less, about twenty meters, about thirty-seven meters, and about forty meters. Still other examples include rotor blades between about fifty meters and about one hundred meters long.

Despite how blades 24 are shown in FIG. 1, rotor 14 may have blades 24 of any suitable shape, and may have blades 24 of any type and/or any configuration, whether such shape, type, and/or configuration is described and/or shown herein. One example of another type, shape, and/or configuration of blades 24 is a ducted rotor (not shown) having a turbine (not shown) contained within a duct (not shown). Another example of another type, shape, and/or configuration of blades 24 is included within a Darrieus wind turbine, sometimes referred to as an "eggbeater" turbine. Yet another example of another type, shape, and/or configuration of blades 24 is included within a Savonious wind turbine. A further example of another type, shape, and/or configuration of blades 24 is included within a traditional windmill for pumping water, such as, but not limited to, four-bladed rotors having wooden shutters and/or fabric sails. Moreover, wind turbine 10 may, in some embodiments, be a wind turbine having rotor 14 that generally faces upwind to harness wind energy, and/or may be a wind turbine having rotor 14 that generally faces downwind to harness energy. Of course, in any embodiment, rotor 14 may not face exactly upwind and/or downwind, but may face generally at any angle (which may be variable) with respect to a direction of the wind to harness energy therefrom.

Referring now to FIG. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator such as a doubly fed induction generator. Generator 26 includes a stator (not shown) and a rotor (not shown). Rotor 14 includes a main rotor shaft 28 (also referred to as a "low speed shaft") coupled to hub 22 for rotation therewith. Generator 26 is coupled to main rotor shaft 28 such that rotation of main rotor shaft 28 drives rotation of the generator rotor, and therefore, operation of generator 26. In the exemplary embodiment, the generator rotor has a rotor shaft 30 (also referred to as a "high speed shaft") coupled thereto and coupled to main rotor shaft 28 through a gearbox 32. In other embodiments, the generator rotor is directly coupled to main rotor shaft 28, sometimes referred to as a "direct-drive wind turbine."

In some embodiments, one or more processors (not shown in FIG. 2) within a control panel 34 form a control system 36 used for overall system monitoring and control including pitch and speed regulation, high-speed shaft and yaw brake application, yaw and pump motor application, and power level and fault monitoring. Alternative distributed or centralized control architectures may be used in some embodiments. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In various embodiments, control system 36 provides control signals to a variable blade pitch drive 38 to control the pitch of blades 24 that drive hub 22 as a result of wind. Hub 22 and blades 24 together form wind turbine rotor 14. A drive train 40 of wind turbine 10 includes main rotor shaft 28, connected to hub 22, and to gearbox 32 that, in some embodiments, utilizes a dual path geometry to drive high speed shaft 30 enclosed within gearbox 32. High speed shaft 30 is used to drive generator 26 which is supported by a main frame 42. Another suitable type of generator, by way of non-limiting example, is a multi-pole generator that can operate at the speed of the main rotor shaft 28 in a direct drive configuration, without requiring gearbox 32.

The torque of rotor 14 drives the generator rotor to thereby generate variable frequency AC electrical power from rotation of rotor 14. Generator 26 has an air gap torque between the generator rotor and stator that opposes the torque of rotor 14. A frequency converter 44 is coupled to generator 26 for converting the variable frequency AC to a fixed frequency AC for delivery to an electrical load (not shown in FIG. 2), such as, but not limited to, a power grid coupled to generator 26. Frequency converter 44 may be located anywhere within or remote to wind turbine 10. For example, in the exemplary embodiment, frequency converter 44 is located within base 20 of tower 18.

In some embodiments, wind turbine 10 may include a rotor speed limiter, for example, but not limited to a disk brake 46. Disk brake 46 brakes rotation of rotor 14 to, for example, slow rotation of rotor 14, brake rotor 14 against full wind torque, and/or reduce the generation of electrical power from electrical generator 26. Further, in some embodiments, wind turbine 10 may include a yaw system 48 for rotating body 12 about an axis of rotation 50 for changing a yaw of rotor 14, and more specifically for changing a direction faced by rotor 14 to, for example, adjust an angle between the direction faced by rotor 14 and a direction of wind.

Figure 3:
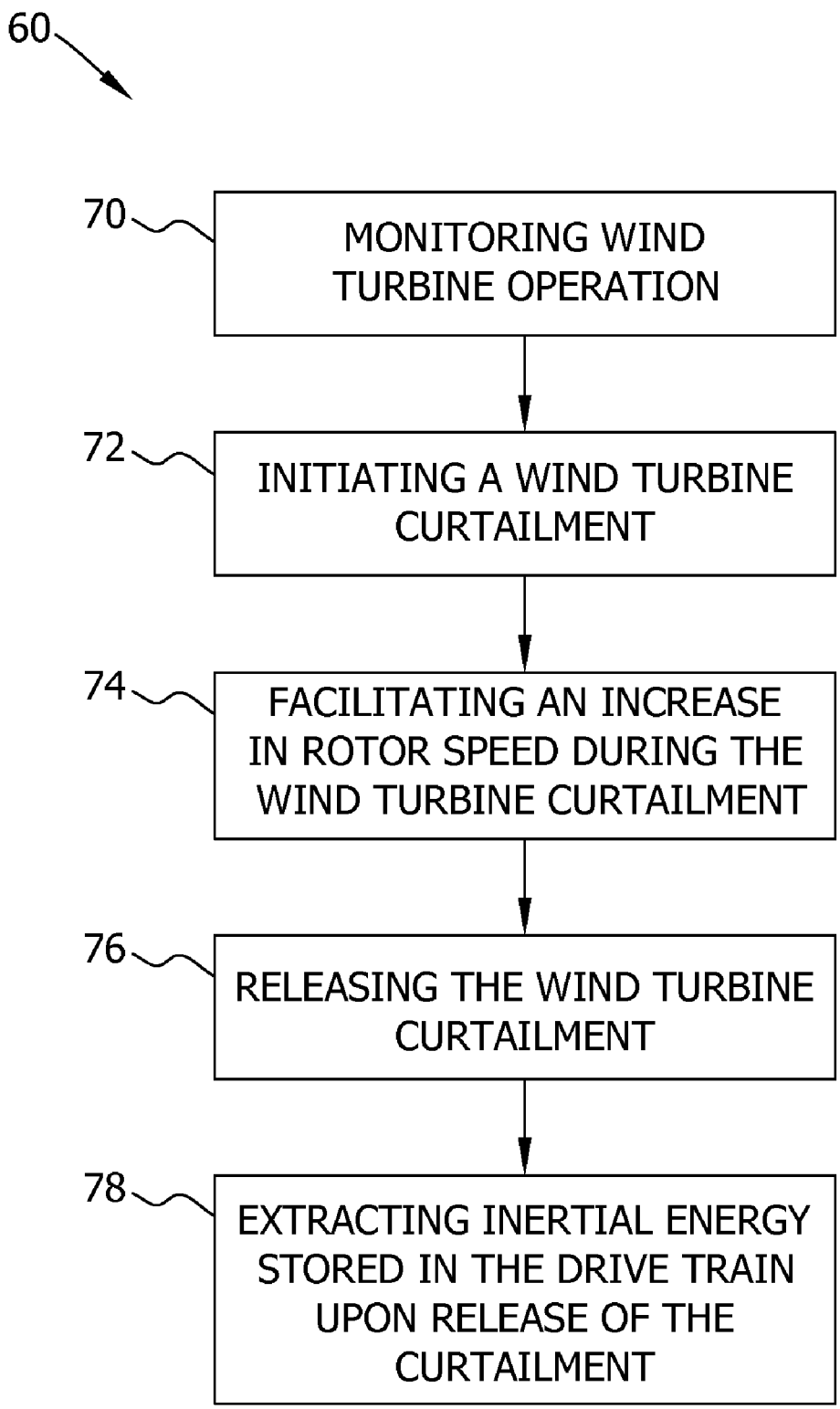
FIG. 3 is a flow diagram of an exemplary method for extracting inertial energy from a wind turbine.

FIG. 3 is a flow chart 60 illustrating an exemplary method for operating a wind turbine, for example, wind turbine 10 (shown in FIG. 2) during curtailment of wind turbine 10. More specifically, flow chart 60 illustrates an exemplary method for extracting inertial energy from, for example, wind turbine 10. The method includes monitoring 70 wind turbine operation. For example, power generation and power grid demand may be monitored 70, locally and/or remotely from wind turbine 10. In some examples, control system 36 (shown in FIG. 2) is configured to monitor 70 power generation and power grid demand. The method may also include initiating 72 a curtailment of wind turbine 10 upon the occurrence of a curtailment event. By initiating 72 the curtailment of wind turbine 10, a power level output by wind turbine 10 is reduced. Typically, the curtailment is initiated 72 by adjusting a blade pitch of the rotor blades, for example, rotor blades 24 (shown in FIG. 2). The blade pitch is adjusted to reduce a speed of rotation of the rotor, for example, rotor 14 (shown in FIG. 2). By reducing the speed of rotation of rotor 14, the power output by wind turbine 10 is reduced.

In the exemplary embodiment, rather than reducing the speed of rotation of rotor 14, initiating 72 the curtailment of wind turbine 10 includes lowering a torque demand on generator 26. More specifically, a frequency converter, for example, frequency converter 44 (shown in FIG. 2) is configured to reduce the torque demand on generator 26 upon initiating the curtailment. By reducing the torque demand on generator 26, the power output by wind turbine 10 is reduced, for example, to a curtailment level.

As described above, the method includes initiating 72 the curtailment of wind turbine 10 upon the occurrence of a curtailment event. The curtailment event may include power generation exceeding power grid demand, power generation exceeding a stored curtailment power level, and/or a low power demand period of time. Alternatively, curtailment may follow a curtailment schedule. For example, it may be determined that during peak electricity usage time periods, a power grid is able to deliver a level of power generated by wind turbine 10 that is 80% of a maximum possible power wind turbine 10 is able to generate. During non-peak time periods, the power grid may only be able to deliver a level of power generated by wind turbine 10 that is 50% of the maximum possible power wind turbine 10 is able to generate. Curtailment facilitates providing the power grid with a level of power the power grid is able to deliver.

In the exemplary embodiment, the method also includes facilitating 74 an increase in a rotor speed during the wind turbine curtailment. More specifically, control system 36 is configured to adjust a pitch angle of one or more of blades 24, for example, by controlling variable blade pitch drive 38 (shown in FIG. 2). Adjusting the pitch angle of rotor blades 24 facilitates increasing the speed of rotation of rotor 14 during curtailment of wind turbine 10. In the exemplary embodiment, the torque demand on generator 26 is reduced, maintaining the output power of wind turbine 10 at or below the curtailment level, while the speed of rotation of rotor 14 is allowed to increase. As described above, typically, during curtailment, blades 24 are pitched such that wind passes over blades 24, thereby minimizing an effect the wind has on blades 24 and reducing the speed of rotation of rotor 14. In contrast, in the exemplary embodiment, the method includes adjusting operation of wind turbine 10 to facilitate increasing the speed of rotation of rotor 14 during curtailment to above an optimum rated speed for a torque-power curve. In an alternative embodiment, control system 36 is configured to adjust a yaw angle of body 12 (shown in FIG. 2) by controlling yaw system 48 (shown in FIG. 2). Control system 36 may be configured to adjust the pitch angle of blades 24 and/or a yaw angle of body 12, such that the rotor speed may increase above the optimum rated speed for the torque-power curve, but does not increase to higher than a preset rated maximum rotor speed. The preset rated maximum rotor speed facilitates preventing or minimizing damage to wind turbine 10 due to an overspeed condition. Adjusting operation of wind turbine 10 facilitates capturing aerodynamic energy in the air (e.g., that would have been wasted due to the curtailment) and storing the aerodynamic energy as inertial energy in rotating drive train 40 of wind turbine 10.

In the exemplary embodiment, the method also includes releasing 76 the wind turbine curtailment. In the exemplary embodiment, control system 36 determines when to release 76 the curtailment based at least partially on the monitored 70 power generation and power grid demand. Alternatively, control system 36 determines when to release the curtailment based at least partially on a curtailment schedule. Although described as being determined by control system 36, a determination on when to release 76 the curtailment may also be performed by a centralized wind farm controller (not shown in FIG. 3) or by any other suitable device. Releasing 76 the wind turbine curtailment includes adjusting operation of wind turbine 10 to allow the power output by wind turbine 10 to increase to a power level higher than the curtailment level. For example, blade pitch, yaw angle, and/or torque demand on generator 26 may be adjusted.

In the exemplary embodiment, the method also includes extracting 78 inertial energy stored in drive train 40 upon release 76 of the curtailment. In the exemplary embodiment, an extraction device is configured to extract 78 inertial energy stored in drive train 40. A frequency converter, for example, frequency converter 44 (shown in FIG. 2) may be configured to extract 78 inertial energy stored in drive train 40 upon release 76 of the curtailment. Although described herein as a frequency converter, the extraction device may be any device that allows wind turbine 10 to function as described herein. To extract 78 inertial energy stored in drive train 40, frequency converter 44 may be configured to increase a torque demand on generator 26 upon release of the wind turbine curtailment. Increasing the torque demand on generator 26 facilitates converting the inertial energy stored in drive train 40 of wind turbine 10 into electrical power for delivery to a power grid. More specifically, to increase the torque demand on generator 26, frequency converter 44 may be configured to adjust a phase of generator 26 to increase generator torque.

Figure 4:
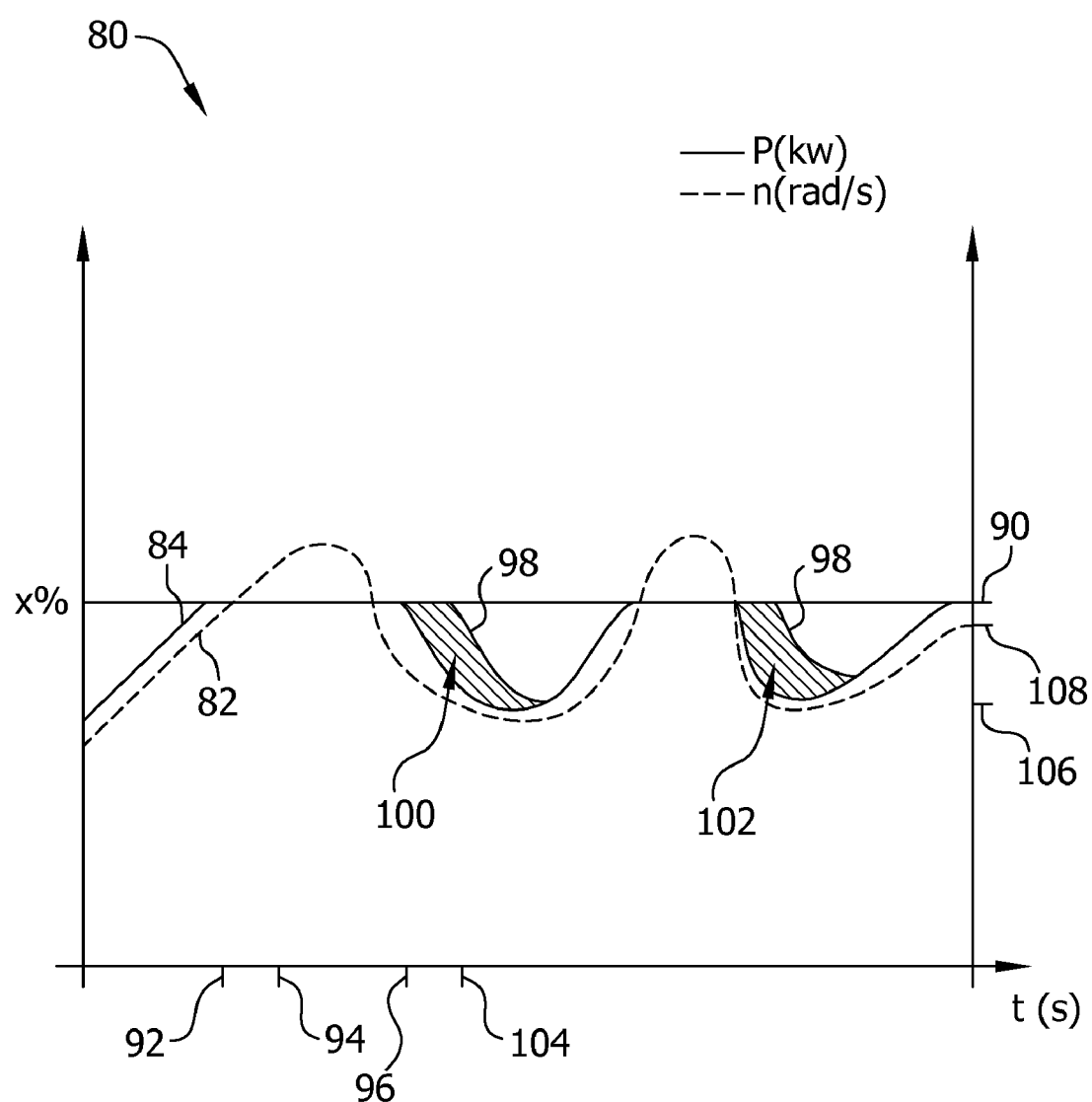
FIG. 4 is a plot of exemplary rotor speeds and corresponding power generated over time.

FIG. 4 is a plot 80 of exemplary rotor speeds (n) 82 and the corresponding power generated (P) 84 by, for example, generator 26 (shown in FIG. 2) over time (t). For example, power generated 84 may be measured in kilowatts (kW), rotor speeds 82 may be measured in radians per second (rad/s), and time may be measured in seconds (s). In the exemplary embodiment, a curtailment level 90 is predetermined to be X % of a maximum power able to be generated by, for example, wind turbine 10 (shown in FIG. 1). In the exemplary embodiment, at a first time 92, rotor speed 82 increases to a level where power generated 84 rises above curtailment level 90. In the exemplary embodiment, in order for power generated 84 to remain at or below curtailment level 90, a torque demand on generator 26 is reduced. In the exemplary embodiment, rotor speed 82 is allowed to increase above curtailment level 90, for example, at a time 94. For example, control system 36 is configured to adjust the pitch of blades 24 (shown in FIG. 2) such that rotor speed 82 increases past curtailment level 90, but does not increase beyond a rated maximum rotor speed. By actively facilitating this increase in rotor speed 82, aerodynamic energy from the wind is captured as inertial energy, which is stored in drive train 40 (i.e., rotating components) of wind turbine 10.

In the exemplary embodiment, as rotor speed 82 decreases, for example, due to reduced wind speed, blade pitch adjustment, and/or yaw angle adjustment, power generated 84 is reduced below curtailment level 90 at time 96. In the exemplary embodiment, at time 96, the curtailment is released. Also, at time 96, a signal is provided to, or generated by, for example, control system 36, indicating a desire for more output power. The signal may be automatically generated by control system 36 (e.g., upon the reduction of power generated 84 to below curtailment level 90) and/or may be manually provided by an operator of wind turbine 10. In the exemplary embodiment, control system 36 provides an extraction device, for example, frequency converter 44 (shown in FIG. 2) with an increased torque demand value. The increased torque demand value causes frequency converter 44 to change the excitation of generator 26, which causes the power generated 84 to increase to a power generated 98. Increasing the torque demand value facilitates converting the inertial energy stored in the rotating components of wind turbine 10 into electrical power for delivery to the power grid. The additional electrical power converted from inertial energy is illustrated in FIG. 4 at shaded area 100 and shaded area 102. For example, at time 104, without capturing the inertial energy, power generated 84 would be at a power level 106. Power level 106 is obtained only through conversion of currently available wind energy into rotational energy by blades 24. In contrast, at time 104, power generated 98 is a power level 108 generated by conversion of the stored inertial energy into electrical power in addition to conversion of currently available wind energy into electrical power.

Figure 5:
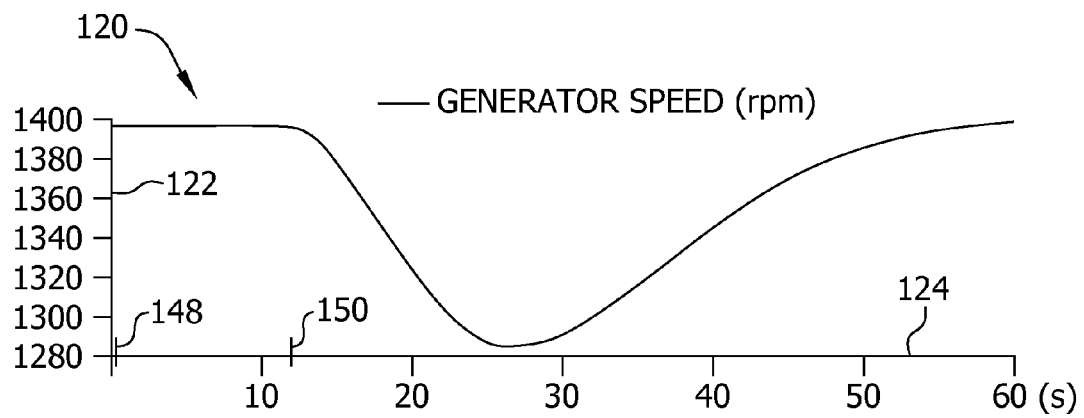
FIG. 5 is a plot that illustrates changes in a generator speed over a time period.
Figure 6:
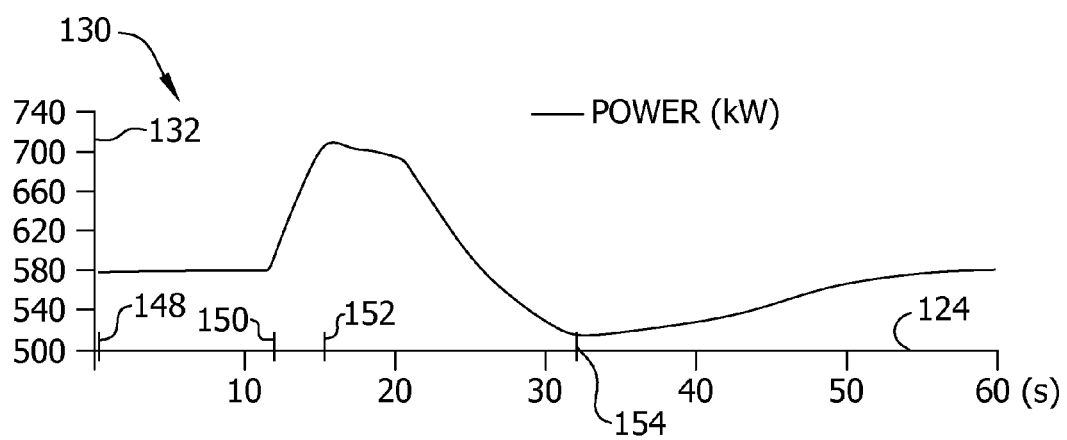
FIG. 6 is a plot that illustrates changes in a generator output power over the time period also shown in FIG. 5.
Figure 7:
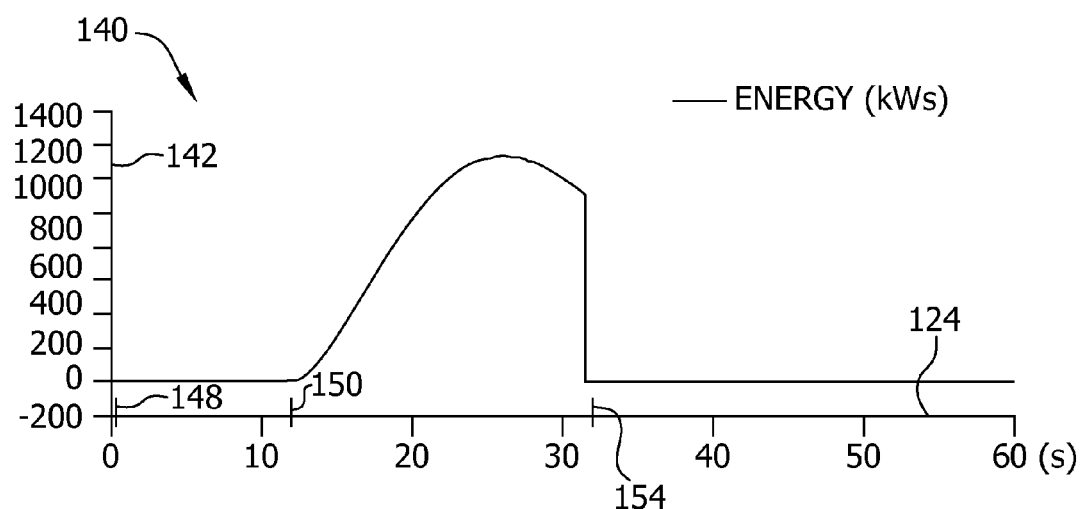
FIG. 7 is a plot that illustrates changes in a generator output energy level over the time period shown in FIG. 5.

FIG. 5 is a plot 120 that illustrates changes in a generator speed 122, measured in revolutions per minute (rpm), over a time period 124, measured in seconds (s). FIG. 6 is a plot 130 that illustrates changes in a generator output power 132, measured in kilowatts (kW), over time period 124. FIG. 7 is a plot 140 that illustrates changes in a generator output energy level 142, measured in kilowatt-seconds (kWs), over time period 124. FIGS. 5-7 are illustrative of the behavior of a wind turbine generator, for example, generator 26 (shown in FIG. 2) of wind turbine 10 (shown in FIG. 2). In the illustrated example, a substantially constant generator speed 122 from a time 148 to a time 150 produces a substantially constant generator output power 132. Between time 148 and time 150, generator 26 and rotor 14 are in balance. In the illustrated example, at time 150 a signal is provided to, or generated by, for example, control system 36, indicating a desire for more output power 132. The signal may be automatically generated by control system 36 (e.g., upon the reduction of output power 132 to below a curtailment level, for example, at time 96 (shown in FIG. 4)) and/or may be manually provided by an operator of wind turbine 10. In the exemplary embodiment, control system 36 provides an extraction device, for example, frequency converter 44 (shown in FIG. 2), with a signal directing frequency converter 44 to extract inertial energy stored in drive train 40. For example, control system 36 may provide frequency converter 44 with an increased torque demand value. The increased torque demand value causes frequency converter 44 to change the excitation of generator 26, which causes the increase in output power 132 shown between time 150 and a time 152. Frequency converter 44 applies more torque to generator 26 than is applied to rotor 14 by the wind, which causes rotor speed, and therefore, generator speed 122 to decrease after time 150.

Even as generator speed 122 decreases after time 150, the generator output power 132 increases due to the release of the inertial energy stored in drive train 40 of wind turbine 10. At time 152, generator output power 132 reaches a maximum power and begins to decrease as the stored inertial energy is converted into electrical power (i.e., output power 132). Further, at a time 154, the inertial energy stored in drive train 40 of wind turbine 10 has dissipated. After time 154, generator output power 132 is generated only from aerodynamic energy captured by blades 24 from the wind.

Described herein are exemplary methods and systems for extracting inertial energy from a wind turbine. More specifically, the methods and systems described herein enable active storage of inertial energy during curtailment operation of a wind turbine, and conversion of the inertial energy to electrical power upon release of the curtailment operation. The methods and systems described herein facilitate generating electrical power from inertial energy, in addition to captured aerodynamic energy, during a drop in wind speed.

The methods and systems described herein facilitate efficient and economical operation of a wind turbine. Exemplary embodiments of methods and systems are described and/or shown herein in detail. The methods and systems are not limited to the specific embodiments described herein, but rather, components of each system, as well as steps of the methods, may be utilized independently and separately from other components and steps described herein. Each component, and each method step, can also be used in combination with other components and/or method steps. Although described herein within the context of a wind turbine, the methods and systems described herein may be applied to, for example, without limitation, power plants that include hydroelectric turbines or steam turbines.

When introducing elements/components/etc. of the methods and systems described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for operating a wind turbine during a curtailment operation, the wind turbine comprising a generator and a wind turbine rotor having at least one rotor blade, the wind turbine also comprising a drive train that includes at least one shaft coupled to the wind turbine rotor and configured to drive the generator, said system comprising:
   a control system configured to increase a speed of rotation of the wind turbine rotor beyond an optimum rated speed during the curtailment operation of the wind turbine; and,
   an extraction device configured to extract inertial energy stored in the drive train upon release of the curtailment operation.

2. A system in accordance with claim 1, wherein said extraction device is configured to increase a torque demand on the generator upon release of the curtailment operation to facilitate converting inertial energy stored in the drive train to electrical power for delivery to a grid.

3. A system in accordance with claim 2, wherein said extraction device comprises a frequency converter configured to control excitation of the generator to increase the torque demand on the generator upon release of the curtailment operation.

4. A system in accordance with claim 1, wherein said control system is configured to increase the speed of rotation of the rotor beyond the optimum rated speed to facilitate converting available aerodynamic energy into inertial energy during the curtailment operation.

5. A system in accordance with claim 1, wherein the optimum rated speed is based at least partially on an optimum torque-power curve.

6. A system in accordance with claim 1, wherein said control system is configured to allow the rotor speed to increase to a rated maximum rotor speed.

7. A system in accordance with claim 1, wherein said control system is configured to control operation of the wind turbine in order to allow the speed of rotation of the rotor to increase beyond the optimum rated speed.

8. A system in accordance with claim 1, wherein said control system is configured to adjust at least one of a pitch of the at least one rotor blade and a yaw angle of the wind turbine to facilitate controlling the speed of rotation of the rotor.

9. A method for operating a wind turbine during curtailment of the wind turbine, the wind turbine comprising a generator and a rotor having at least one rotor blade, the wind turbine also comprising a drive train that includes at least one shaft coupled to the rotor and configured to drive the generator, said method comprising:
 operatively coupling a control system to the wind turbine, the control system configured to adjust wind turbine operation to facilitate increasing a speed of rotation of the rotor during curtailment of the wind turbine; and,
 operatively coupling an extraction device to the generator, the extraction device configured to extract inertial energy stored in the drive train upon release of the curtailment.

10. A method in accordance with claim 9, wherein the extraction device is configured to increase a torque demand on the generator upon release of the curtailment to facilitate converting inertial energy stored in the drive train to electrical power for delivery to a power grid.

11. A method in accordance with claim 10, wherein operatively coupling the extraction device comprises operatively coupling a frequency converter to the generator, the frequency converter configured to control excitation of the generator to increase the torque demand on the generator upon release of the curtailment.

12. A method in accordance with claim 10, further comprising configuring the control system to:
 monitor power generation;
 monitor power grid demand; and,
 initiate the curtailment of the wind turbine when power generation exceeds power grid demand.

13. A method in accordance with claim 9, further comprising configuring the control system to:
 monitor power generation of the generator; and,
 initiate the curtailment of the wind turbine when power generation exceeds a stored power generation level.

14. A method in accordance with claim 9, wherein the control system is further configured to adjust at least one of a wind turbine body yaw angle and a pitch angle of at least one rotor blade to facilitate increasing the speed of rotation of the rotor up to a rated maximum rotor speed.

15. A method in accordance with claim 9, wherein the control system is further configured to adjust a pitch angle of at least one rotor blade to facilitate increasing the speed of rotation of the rotor above an optimum rated speed for a predetermined torque-power curve.

* * * * *